Sept. 29, 1964

C. T. JOHNSON 3,150,404

ELECTROMAGNETIC AND VACUUM DEBRIS COLLECTOR

Filed Aug. 31, 1962

INVENTOR.
CLARENCE T. JOHNSON,
BY
McMorrow, Berman & Davidson
ATTORNEYS.

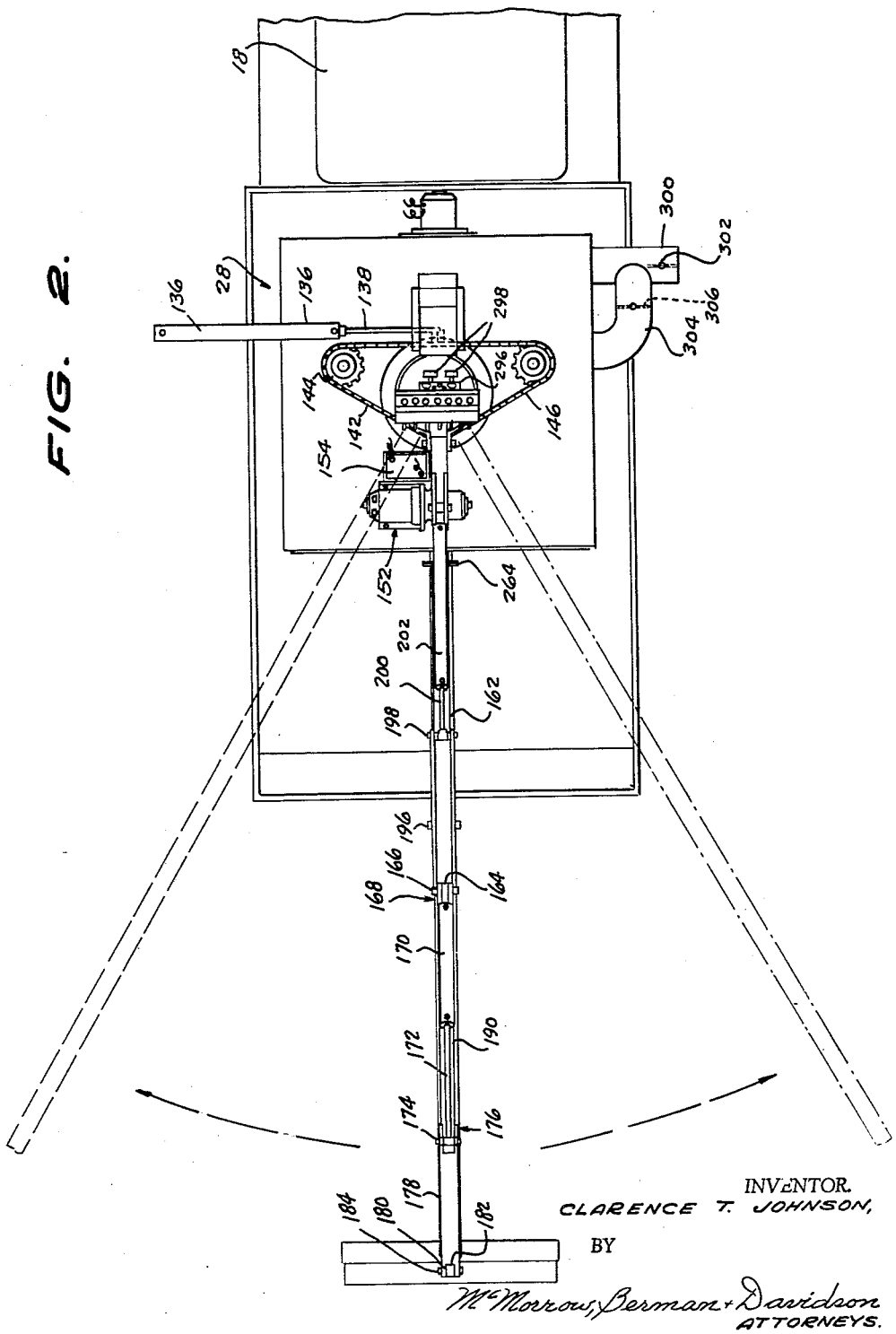

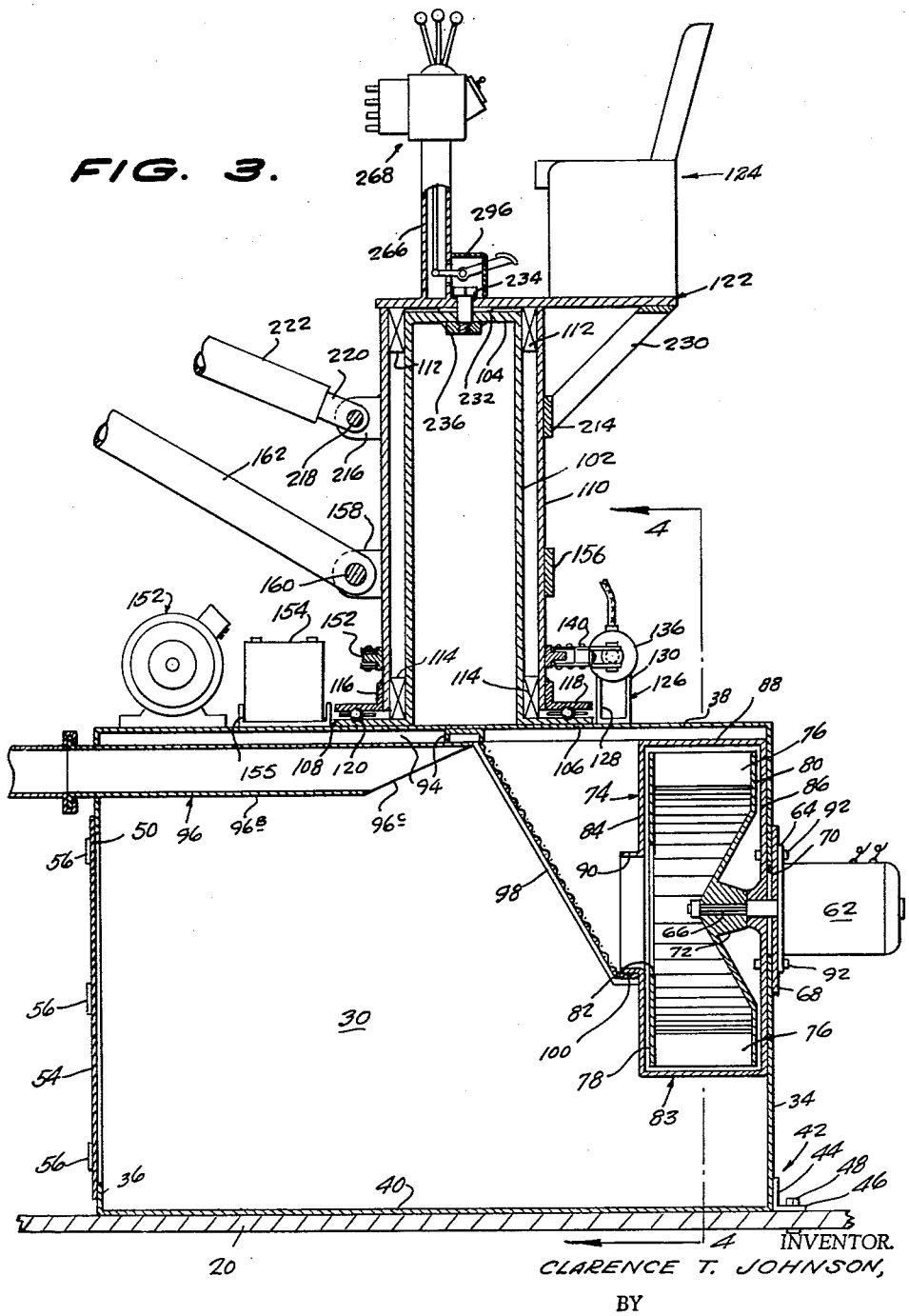

Sept. 29, 1964    C. T. JOHNSON    3,150,404
ELECTROMAGNETIC AND VACUUM DEBRIS COLLECTOR
Filed Aug. 31, 1962    5 Sheets-Sheet 4
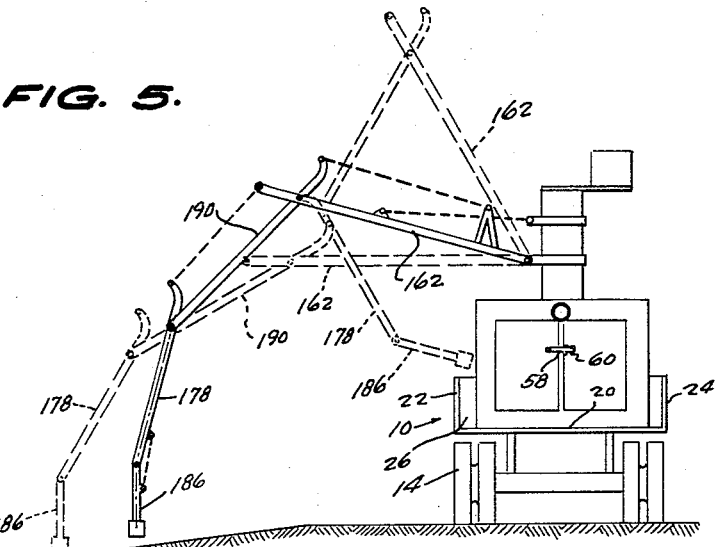
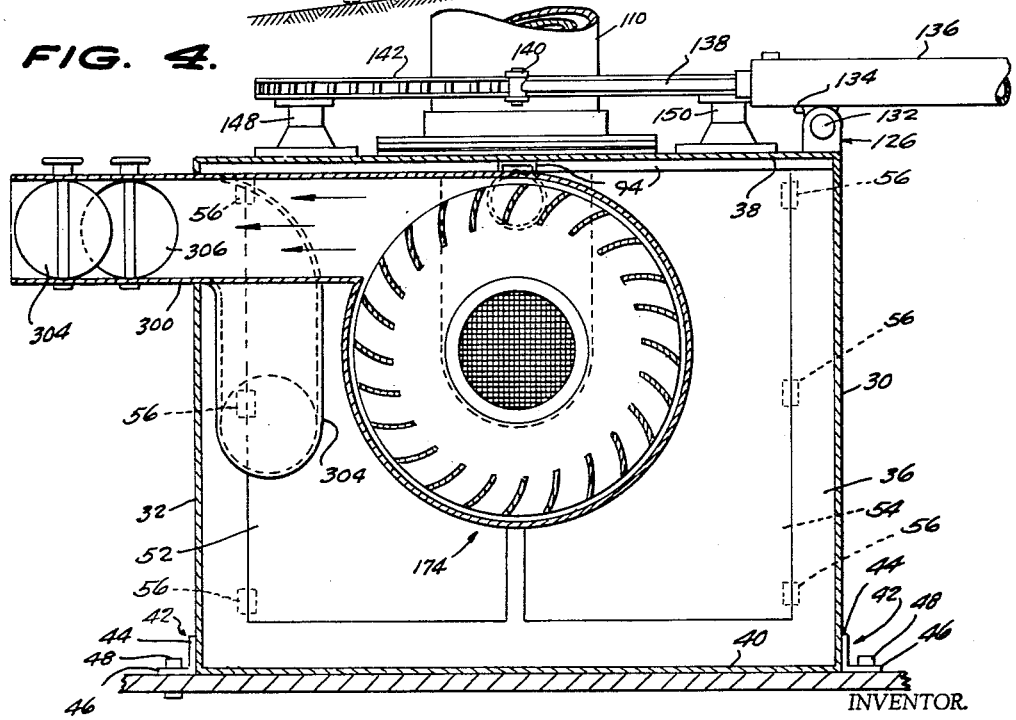
INVENTOR.
CLARENCE T. JOHNSON,
BY
*McMorrow, Berman & Davidson*
ATTORNEYS.

Sept. 29, 1964 C. T. JOHNSON 3,150,404
ELECTROMAGNETIC AND VACUUM DEBRIS COLLECTOR
Filed Aug. 31, 1962 5 Sheets-Sheet 5
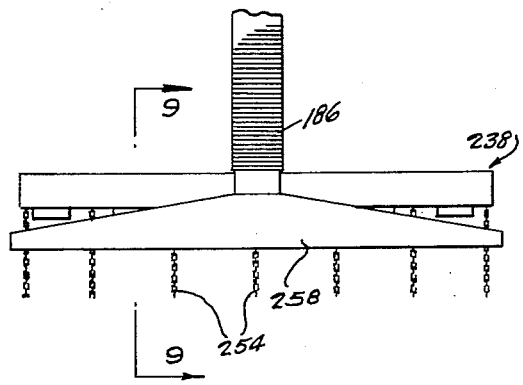
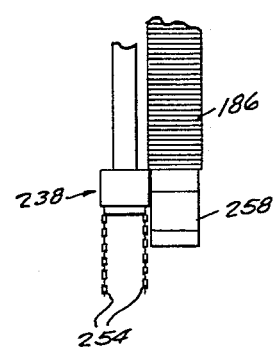
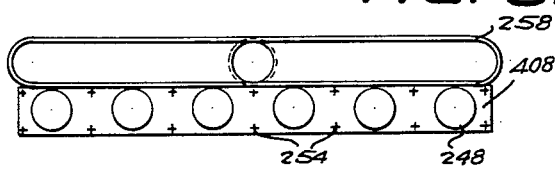
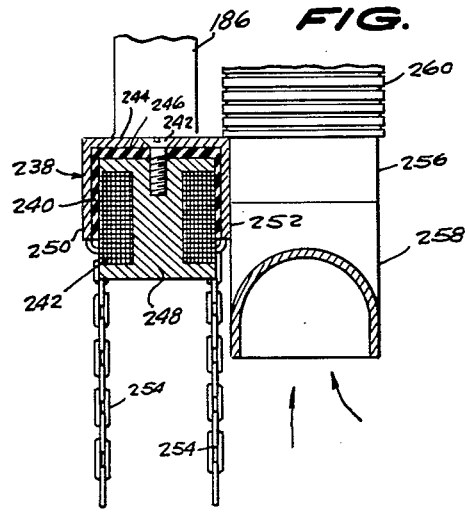
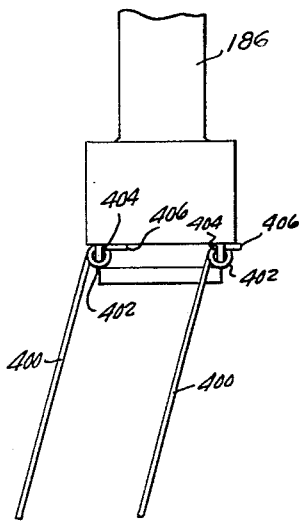
INVENTOR.
CLARENCE T. JOHNSON,
BY
McMorrow, Berman + Davidson
ATTORNEYS.

United States Patent Office 3,150,404
Patented Sept. 29, 1964

3,150,404
ELECTROMAGNETIC AND VACUUM DEBRIS
COLLECTOR
Clarence T. Johnson, Ojai, Calif., assignor to M.J.C.
Development Company, Inc., Sunnyvale, Calif.
Filed Aug. 31, 1962, Ser. No. 220,644
2 Claims. (Cl. 15—339)

This invention relates, in general, to a machine or device for removing debris of magnetic or non-magnetic materials from floors, roads, streets or other similar surfaces and, more specifically, the instant invention pertains to a mobile unit for effecting the debris collection.

One of the primary objects of this invention is to provide combined electromagnetic and vacuum means which may be operated independently of one another or in combination with one another to collect metallic and non-metallic debis and/or refuse from streets, roads, or other similar surfaces, the collector means being adaptable for a one-man operation.

Another object of this invention is to provide electromagnetic and vacuum debris collecting means of the type generally defined supra, together with means for moving the debris collector means about a vertical axis, and means for vertically adjusting the collector means relative to the surface being cleaned, and further means for adjusting the debris collector means in radial directions with respect to said vertical axis.

Still another object of this invention is to provide a debris collecting device of the type generally referred to above, the controls for the device being non-complex and within easy reach of the operator, and to provide portable means to effect transfer of the device from one site to another.

This invention contemplates, as a further object thereof, the provision of an electromagnetic and vacuum debris collector machine or device which is non-complex in construction and assembly, inexpensive to manufacture and maintain, and which is durable in use.

Other and further objects and advantages of the instant invention will become more evident from a consideration of the following specification when read in the light of the accompanying drawings, in which:

FIGURE 2 is a top plan view of the electromagnetic and vacuum debris collecting device shown in FIGURE 1, and illustrating in broken lines the swinging movements of the several booms;

FIGURE 3 is an enlarged longitudinal cross-sectional view illustrating details of the collector bin construction and the means for supporting the inner ends of the booms and for effecting arcuate movement thereof about a vertical axis;

FIGURE 4 is a fragmentary detail cross-sectional view, FIGURE 4 being taken substantially on the vertical plane of line 4—4 of FIGURE 3, looking in the direction of the arrows, FIGURE 4 illustrating further details of the collecting bin construction and showing in side elevation the means for pivoting the booms about their vertical axes;

FIGURE 5 is an end elevational view of the electromagnetic and vacuum debris collector showing the boom as having been swung through a horizontal arc of approximately 180 degrees, FIGURE 5 showing in full lines a working position of the collector device and in broken lines, a second working position of the device;

FIGURE 6 is a side elevational view of the electromagnetic means and vacuum nozzle utilized in this machine and showing the association therebetween;

FIGURE 7 is an end elevational view of the electromagnetic and vacuum means shown in FIGURE 6;

FIGURE 8 is a bottom plan view of the electromagnetic and vacuum means shown in FIGURE 6;

FIGURE 9 is an enlarged detail cross-sectional view, FIGURE 9 being taken substantially on the vertical plane of line 9—9 of FIGURE 6, looking in the direction of the arrows; and FIGURE 10 illustrates, in perspective, a modified form of the electromagnetic pick-up means according to this invention.

Figure 1:
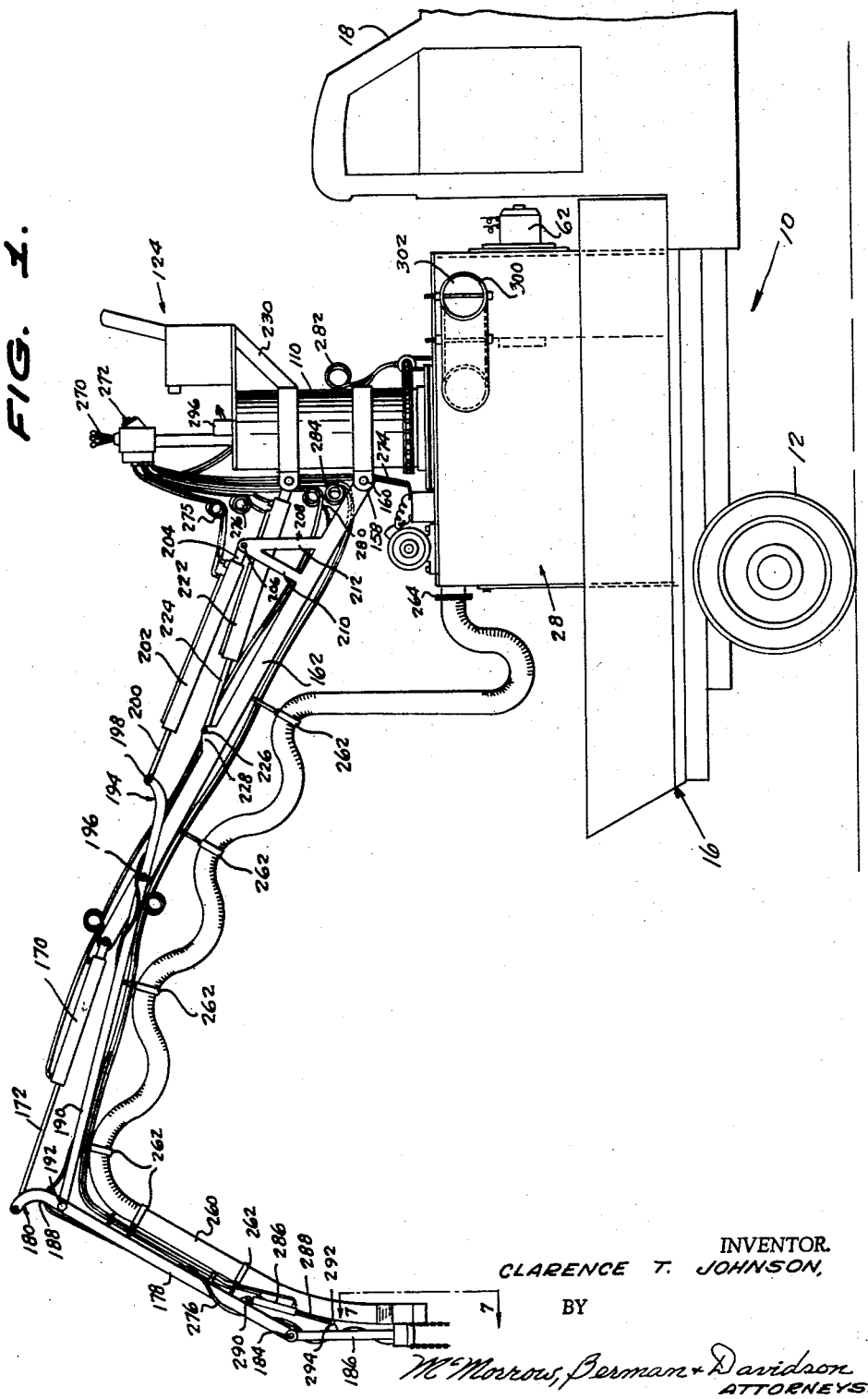
FIGURE 1 is a side elevational view of an electromagnetic and vacuum debris collecting mechanism or device constructed in accordance with this invention, and illustrating the same as being mounted on the bed of a conventional truck or other automotive means.

Reference numeral 10 designates, in general, a conventional truck or other similar automotive transportation means. The truck 10 is provided with the usual front and rear wheels (see FIGURES 1 and 5), the wheels 12, 14 having supported thereon the usual chassis 16. The forward end of the truck 10 is provided with the customary cab 18 supported on the chassis 16, and also supported on the chassis 16 is an elongated, substantially rectangular truck bed 20. Reference numerals 22, 24 denote the conventional longitudinally-extending, laterally-spaced and substantially parallel side walls, and reference numeral 26 designates a front end wall which extends across the forward ends of the side walls 22, 24. Reference numeral 28 designates, in general, a debris or refuse collector bin having an elongated, substantially hollow rectangular construction and which includes a pair of elongated, substantially rectangular side walls 30, 32 laterally spaced from one another and extending in parallel relationship relative to each other, front and rear end walls 34, 36 each having a rectangular configuration and extending across and being connected to adjacent pairs of ends of the side walls 30, 32, and substantially rectangular top and bottom walls 38, 40, respectively, complete the hollow cubical receptacle. The collector bin 28 is anchored to the truck bed 20 by means of angle members 42 having leg portions 44 welded or otherwise secured to the lower ends of the side walls 30, 32 and the front wall 34. The foot portions 46 of the angle members 42 are fixedly connected to the bod 20, as by bolts 48 or other conventional means.

The end wall 36 is formed with a central substantially rectangular clean-out access opening 50 closed by a pair of doors 52, 54 (see FIGURES 3 and 5) hingedly connected at 56 to the end wall 36 adjacent the marginal vertical edges of the opening 50. Any conventional means may be employed to releasably secure the free vertical edges of the doors 52, 54 in closed confronting relationship.

Reference numeral 62 indicates an electric motor having a casing flange 64 (see FIGURE 3) and provided with a drive shaft 66 that passes transversely through the motor mounting plate 68 extending across an opening 70 formed in the front end wall 34 and into the collector bin 28. The drive shaft 66 connects with the hub 72 of a vacuum or exhaust pump 74 having a plurality of impeller blades 76 secured to the hub 72 for rotation therewith. As is seen in the drawings, the blades 76 have their respective opposed ends fixedly secured to a pair of laterally-spaced cylindrical side plates 78, 80, the latter being integral with or fixedly secured to the hub 72. The cylindrical side plate 78 is centrally apertured as at 82 to permit the passage of air therethrough. The vacuum pump 74 includes a substantially hollow cylindrical housing 83 having opposed substantially circular parallel side walls 84, 86 held in laterally-spaced relation by a peripherally connected cylindrical end wall 88. The housing 83 encases the impeller blades 76 and their associated side plates 78, 80, and has a throated opening 90 formed in the side wall 84 registering with the aperture 82 and being coaxial therewith.

As is seen in FIGURE 3, the flange 64, mounting plate 68, front wall 34, and the side wall 86 are fixedly connected together by bolts 92.

For reasons to become apparent below, the top wall 38 is reinforced by cross brace members 94 having an inverted, substantially U-shaped configuration.

An elongated air inlet conduit 96 extends through the rear wall 36 adjacent the upper end thereof and has an externally-projecting portion 96A and a portion 96B that extends into the collector bin 28. The inner end of the conduit is beveled at 96C to form a downwardly-opening debris and refuse discharge spout. The outer terminal end of the spout 96 may be welded or otherwise secured to one of the cross braces 94 as is the upper end of a substantially rectangular screen 98, the latter being downwardly-inclined at an acute angle relative to the plane of the front end wall 34. The lower end of the screen 98 terminates in an arcuate lip 100 which seats on a lower portion of the throat 90.

Referring more specifically to FIGURE 3, reference numeral 102 designates a vertically-elongated, substantially hollow cylindrical member having an upper end closure wall 104 and an opposed open end integral with an outwardly-extending circumferential flange 106 welded at 108 or otherwise secured to the top wall 38. As seen in the drawings, the vertical axis of the cylindrical member 102 is centrally located between the side walls 30, 32 and forwardly of the top wall 38. A hollow cylindrical sleeve 110 embraces the cylindrical member 102 in concentrically-spaced relation relative thereto and is so held by interposed top and bottom bearings 112, 114, respectively. Secured to the lower end of the sleeve 110 is a collar 116 having an outwardly-extending radial flange 118 superimposed over the flange 106 and held in rotatable elevated position relative thereto by means of interposed bearings 120. The collar 116 is fixedly secured to the sleeve 110 by any conventional means.

The upper end of the sleeve 110 is closed by a horizontal platform 122 that projects laterally therebeyond to form a support for an operator's seat 124 of any desired construction.

Also supported on the top wall 38 is a substantially U-shaped bracket 126 (see FIGURES 3 and 4), the bracket 126 having upstanding side walls 128, 130 which support a bin 132 on which is mounted a tongue 134 that projects radially and downwardly from a hydraulic cylinder 136 having an extendable and contractable piston rod 138. The outer end of the piston rod 138 is provided with conventional coupler means 140 for connection with a link of an endless chain 142. The chain 142 is trained about a pair of idler sprockets 144, 146 supported on standards 148, 150, respectively, fixedly secured, by conventional means not shown, to the top wall 38 on opposite sides of the sleeve 110, and the chain 142 also extends around and meshes with the sprocket 152 fixedly to the sleeve 110 adjacent the lower end thereof. Actuation of the hydraulic cylinder 136 to effect extension and retraction of the piston rod 138 will effect rotation of the sleeve 110 in a clockwise or counterclockwise direction as viewed in FIGURE 2.

A motor-generator unit 152 (see FIGURES 2 and 3) is fixedly secured to the top wall 38 and is employed to charge a battery 154 held in fixed position by means of a substantially rectangular receptacle 155 also secured to the top wall 38.

Reference numeral 156 designates a split collar surrounding the sleeve 110 and fixedly secured thereto as by welding. The collar 156 at the opposed ends thereof is formed with a pair of oppositely-disposed and confronting tabs 158 which receive and support the opposed ends of a pivot pin 160. The pivot pin 160 is connected with one end of an elongated, substantially hollow tubular boom 162 and the other end of the boom 162 terminates in a tongue 164 pivotally connected by pin 166 to a clevis 168 projecting from one end of a second hydraulic cylinder 170. The hydraulic cylinder 170 includes an extendable and retractable piston rod 172 pivotally connected at its outer end by pivot pin 174 to a clevis 176 projecting from one end of a second boom 178. The other end of the boom 178 is also provided with a clevis 180 which receives therein a tongue 182 that is pivotally connected thereto on a pivot pin 184. The tongue 182 is integral with or rigidly affixed to one end of a third boom 186 which normally depends from the boom 178. As is seen in FIGURE 1, the clevis 180 is upwardly and arcuately-curved as is indicated at 188. One end of an elongated, substantially hollow tubular connector lever 190 is pivotally connected at 192 to the clevis 180 adjacent to but spaced from the outer end thereof. The other end of the lever terminates in an upwardly and arcuately-shaped clevis 194 that receives the boom 162 therein adjacent the outer end thereof. As is seen in FIGURES 1 and 2, the boom 162 is connected to the clevis 194 by means of a pivot pin 196 spaced inwardly on the boom 162 from the pivot pin 166. It will also be noted that the pivot pin 196 is spaced inwardly from the outer terminal ends of the clevis 194.

The other terminal end of the clevis 194 carries a pivot pin 198 on which is pivotally secured the outer end of a piston rod 200 of a conventional hydraulic cylinder 202. The piston rod projects from one end of the hydraulic cylinder 202 and is extendable and contractable relative thereto. The other end of the hydraulic cylinder 202 terminates in a tongue 204 connected on pivot pin 206 which is supported at the apex of a pair of laterally-spaced and substantially parallel inverted V-shaped brackets 208. As is seen in FIGURE 1, the lower ends of arms 210, 212 of the brackets 208 are fixedly secured to the boom 162 adjacent to but spaced outwardly from the pivot pin 160.

Reference numeral 214 denotes a second split roller having confronting tabs or ears 216 between which extends a pivot pin 218 on which is pivotally supported a tongue 220 connected to the inner end of a hydraulic cylinder 222. A piston rod 224 is reciprocable relative to the hydraulic cylinder 222 at the other end thereof and is pivotally connected on pivot pin 226 supported at its ends in brackets 228 fixedly secured in laterally-spaced relation and upstanding from the boom 162.

The projecting end of the platform 122 is preferably supported by a pair of brace members 230 having their respective upper ends fixedly secured thereto, and their lower ends connected with the collar 214 in any desirable manner. Interposed between the platform 122 and the end closure wall 104 is a washer 232, and the platform 122 is pivotally connected on the end closure wall 104 by means of the pivot bolt 234 and the lock nut 236.

Fixedly connected to the outer end of the boom 186 is an elongated inverted, substantially U-shaped holder 238 preferably formed of a metallic material. The holder 238 is provided with a liner 240 of non-conductive material such as, for example, rubber or any other suitable dielectric plastic. At longitudinally-spaced intervals a plurality of electromagnets 242 are inserted within the holder 238 and are retained therein by means of screws 243 which pass through the bight portion 244 of the holder 238 and the bight portion 246 of the liner for threaded engagement with the cores 248. Fixedly connected to the side walls 250, 252 are a plurality of longitudinally-spaced metallic drag link chains 254.

Fixedly secured to the side wall 252 is the throat 256 of a nozzle 258 having a substantially concave-convex transverse configuration (see FIGURE 9) with the concave side thereof facing downwardly and opening into a plane substantially parallel, but vertically-spaced from the plane of the opening into the holder 238. The upper end of the throat 256 is fixedly connected to one end of an elongated substantially hollow, tubular flexible conduit 260 which is supported from the boom 162, the connected lever 190 and the boom 178 by means of a plurality of hanger brackets 262.

Projecting vertically and upwardly away from the platform 122 is an elongated, substantially hollow tubular standard 266 (see FIGURES 1 and 3), the lower end of the standard 266 being secured to the platform 122 by any conventional means.

The standard 266 is laterally-spaced from the seat 124 and has secured to the upper end thereof a valve manual 268. The manual 268 is of conventional design and includes a plurality of manually-operable valve-actuating levers 270. Also mounted on the manual 268 is a manually-operated electrical switch 272. The switch 272 is connected through wires 274 and 276 with the electromagnets 242, and pairs of flexible conduits 275, 276, 280 and 282 connect the hydraulic cylinders 202, 222, 170 and 136 with the manual 268, the valve-actuating levers or handles 270 controlling the flow of fluid through these lines, whereby their respective associated piston rods are extended or retracted. The manual 268 is also connected with a pair of flexible cables 284 at one of their respective ends, and the other ends of the flexible cables or conduits 284 are connected with a hydraulic cylinder 286 having a piston rod 288. One end of the hydraulic cylinder 286 is pivotally connected at 290 to the boom 178 adjacent to, but spaced from the pivot pin 184, and the outer end of the piston rod 288 is pivotally connected at 292 to a lug 294 carried on the boom 186.

Reference numeral 296 designates an elongated, substantially rectangular housing from which project a pair of foot-operated levers 298 and constitute hydraulic fluid-control levers for controlling the fluid supply to the manual 268.

The fluid circuits and the valving therefor have not been set forth in the drawings since the circuit and valves are old and well-known in the art. Suffice it to state that as a selected one of the valve handles or levers 270 is pulled toward the operator, fluid will pass from the manual to one side of the piston rod, while at the same time, fluid on the opposite side of the piston rod is being returned to the manual through the other conduit of the last-mentioned pair. Fluid flow through the selected pair of conduits may be reversed by pushing the selected one of the valve-actuating levers in a direction away from the operator, and flow of fluid in either direction is halted by moving the selected one of the handles 270 to a neutral or central position.

Reference numeral 300 designates an air-exhaust pipe having a manually-controlled butterfly valve 302 installed therein. As is seen in the drawings, the air-exhaust conduit 300 projects through the side wall 32 and is in open communication with the exhaust side of the pump 74. Reference numeral 304 denotes a re-circulation pipe having a manually-operable butterfly valve 306 mounted therein. As is seen in FIGURES 2 and 4, one end of the re-circulation pipe 304 is connected to the inlet pipe 300, while the other end of the re-circulation pipe 304 extends through the side wall 32 and depends into the collector bin 28.

Having described and illustrated this invention in detail, it is believed that the operation of the machine or device is self-evident. However, a brief summation thereof is set forth below.

The truck 10 is operated in the usual manner, and if the device is to be operated during truck travel, an operator will occupy the seat 124 facing the manual 268. The switch 272 is turned to its "on" position and, assuming, that it is desired to lower the electromagnets and the nozzle toward the ground or pavement, the operator will select one of the valve handles 270 which controls the flow of hydraulic fluid for the cylinder 222. The piston rod 224 is now extended, causing the boom 162 to pivot downwardly from the full-line position shown in FIGURE 1, to, for example, the full-line position shown in FIGURE 5. Upon completion of this movement, the operator may then effect actuation of the hydraulic cylinder 202 through the operation of one of the control handles 270 to cause the piston rod 200 to move outwardly, whereby the connector link 192 is caused to pivot about the pin 196 in a counterclockwise direction until it is moved from the full-line position shown in FIGURE 1 to, for example, the full-line position illustrated in FIGURE 5. Thereafter, the hydraulic cylinder 170 may be actuated to cause its piston rod 172 to move in a direction away therefrom, and is so moving, the boom 178 pivots around the pivot pin 192 until the boom 178 is turned to the full-line position shown in FIGURE 5. It may well be that the angularity between the axes of the booms 178 and 186 will require adjustment, and if the angle thereof requires correction, the hydraulic cylinder 286 is activated to extend or retract its associated piston rod 288 until the axis of the boom 186 is substantially perpendicular with respect to the surface being cleaned. The drag chains 254 serve merely as a measuring device to advise the operator that the magnetic holder 238 is a given distance from the ground or pavement.

FIGURE 5 illustrates the machine or device in full lines in one of its many adjusted positions. The device could be operated, for example, to extend the electromagnetic holder 238 and the connected nozzle 258 a greater distance, as shown in dotted lines to the left of the full-line position shown in FIGURE 5. Other positions can be achieved from the selective operation of the valve controlling levers 270.

It will be understood, of course, that as the electromagnets 242 sweep the road, pavement, or other type of ground surface, the nozzle 258, due to the vacuum exerted thereon, picks up paper, debris of any light sort, for disposition in the collector bin 28, and that the tin cans and other type of sewage material collected by the electromagnets will be deposited upon the bed 20 through the proper operation of the valve controlling handles 270 causing the boom 186 to be extended across the bed. The position of the boom 186 preparatory to the release of the magnetically-attracted material is shown in FIGURE 5 to the right of the full-line illustration thereof shown in FIGURE 5. As soon as the electromagnets 242 are positioned over the bed, the operator turns the switch 272 to its "off" position and the metal attracted to the magnets 242 will descend, under the force of gravity, to the bed 20.

The sweep of the several booms described herein is substantially in an arc of 180 degrees in order to afford the device the maximum amount of flexibility. This is accomplished, of course, through the activation of the hydraulic cylinder 136 which effects rotation of the chain 146 to cause the sprocket wheel 152 to turn 90 degrees to either side of the full-line position shown in FIGURE 2.

FIGURE 10 illustrates a modification of the invention wherein it is seen that a plurality of drag rods 400 are substituted for the drag chains 254, 256, the drag rods 400 being looped at 402 through eyes 404 which have terminal ends 406 which abut against the core 408 in which the electromagnets 248 are embedded. The rods 400 serve the same purposes as the chains 254.

Having described and illustrated two embodiments of this invention in detail, it will be understood that the same are offered merely by way of example, and that this invention is to be limited only by the scope of the appended claims.

What is claimed is:

1. An electromagnetic and vacuum debris collector comprising an automotive vehicle having a bed supported thereon, a closed debris collector bin mounted thereon adjacent one end thereof, a vacuum pump in said bin exhausting to the atmosphere through a first wall of said bin, a substantially rigid conduit extending through a second wall of said bin on opposite sides thereof with one end of said rigid conduit opening into said bin, an upright substantially hollow cylindrical member having an upper closed end, means rigidly connecting the lower end of said upright member to a third wall of said bin, an elongated upright sleeve encompassing said cylindrical member in spaced concentric relation relative thereto and being rotatable about the vertical axis of said cylindrical member, an operator platform extending across the upper end of said sleeve and projecting therebeyond, an upright standard supported on said platform and having the lower end thereof fixedly secured to said platform, a control manual fixedly secured to the upper end of said standard, a pair of split collars rigidly secured to said sleeve in vertically-spaced relation, each of said collars having their free ends disposed in confronting relation, a pivot pin extending between and supported on each pair of said confronting free ends, a first boom having one of its ends connected on the pivot pin of the lowermost one of said collars, said first boom being pivotal in a substantially vertical direction about said pivot pin, a connector lever pivotally connected adjacent one of its ends to the other end of said first boom, a second boom, means pivotally connecting the other end of said connector link to said second boom adjacent one end thereof, a third boom, means pivotally connecting the other end of said second boom to one end of said third boom, an elongated housing fixedly secured and depending from the other end of said third boom, a plurality of electromagnets fixedly secured within said housing, a downwardly-opening nozzle, means fixedly connecting said nozzle to said housing, an elongated flexible hollow conduit having one of its ends connected with said nozzle and its other end connected to the other end of said rigid conduit, switch means on said manual to selectively effect energization and de-energization of said electromagnets, a first hydraulic cylinder pivotally connected to the pivot pin of the other of said collars and pivotally connected to said first boom intermediate the ends thereof, bracket means on said first boom, a second hydraulic cylinder pivotally connected to said bracket means and to said one end of said connector link, a third hydraulic cylinder pivotally connected to said other end of said first boom and to said one end of said second boom, a fourth hydraulic cylinder pivotally connected to said second and third booms intermediate the ends thereof, and hydraulic fluid conduit means connecting each of said hydraulic cylinders with said control manual for selective operation thereof or in combination with one another.

2. An electromagnetic and vacuum debris collector as defined in claim 1, and a sprocket fixedly secured to said sleeve, and hydraulically-operable means connected to said sprocket to effect rotation of said sleeve about said vertical axis.

References Cited in the file of this patent

UNITED STATES PATENTS

| | | |
|---|---|---|
| 2,702,138 | Ives | Feb. 15, 1955 |
| 2,759,604 | Carpenter | Aug. 21, 1956 |
| 2,772,438 | Diaz | Dec. 4, 1956 |
| 3,028,026 | Palmberg | Apr. 3, 1962 |
| 3,052,908 | Daneman | Sept. 11, 1962 |

FOREIGN PATENTS

| | | |
|---|---|---|
| 529,248 | Italy | June 22, 1955 |
| 1,254,634 | France | Jan. 16, 1961 |